C. M. MUNSON, DEC'D.
J. MUNSON, ADMINISTRATRIX.
PAPER TESTING MACHINE.
APPLICATION FILED OCT. 14, 1911.
1,019,721.
Patented Mar. 5, 1912.
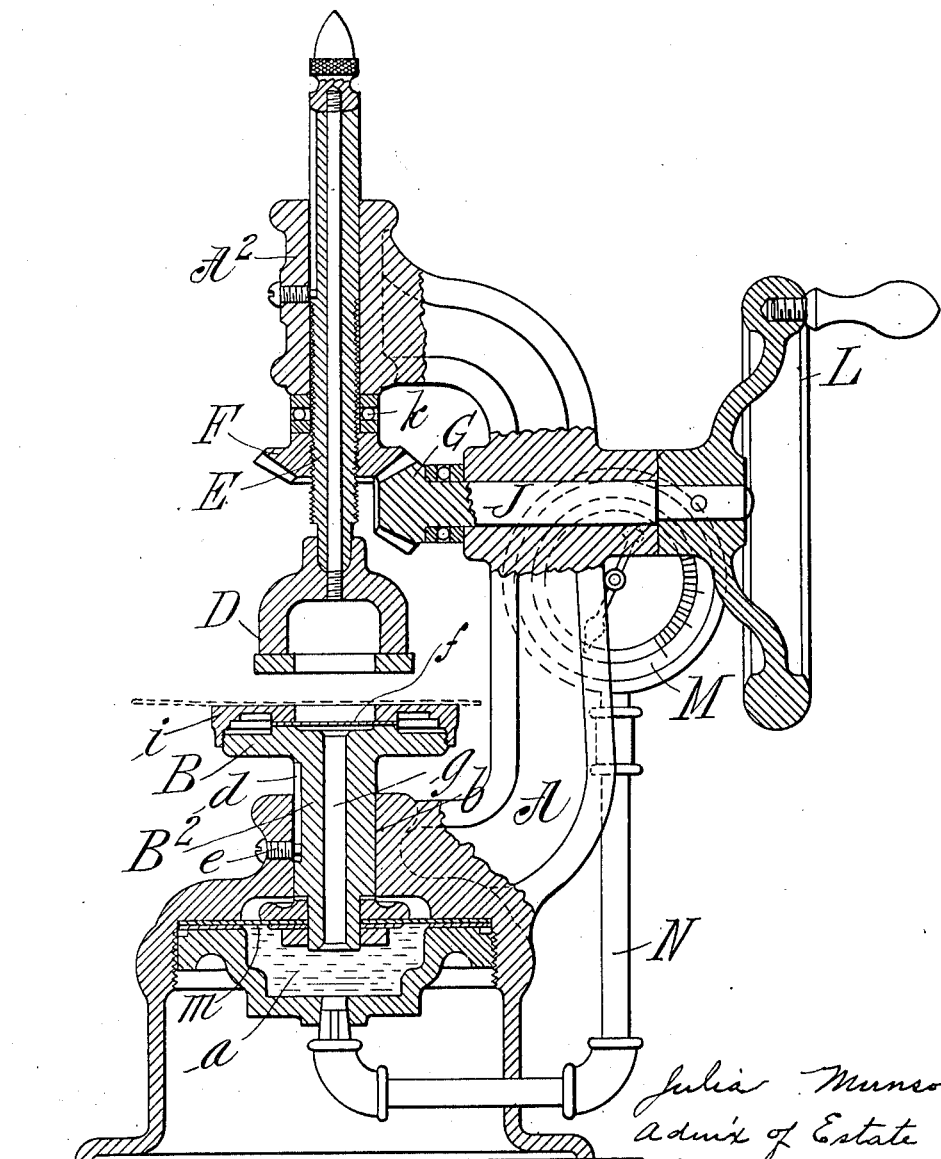

UNITED STATES PATENT OFFICE.

CHARLES M. MUNSON, DECEASED, LATE OF CHICOPEE, MASSACHUSETTS, BY JULIA MUNSON, ADMINISTRATRIX, OF CHICOPEE, MASSACHUSETTS.

PAPER-TESTING MACHINE.

1,019,721.   Specification of Letters Patent.   Patented Mar. 5, 1912.

Application filed October 14, 1911. Serial No. 654,734.

*To all whom it may concern:*

Be it known that CHARLES M. MUNSON, deceased, late a citizen of the United States of America, and resident of Chicopee, in the county of Hampden and State of Massachusetts, did invent certain new and useful Improvements in Paper-Testing Machines, of which the following is a full, clear, and exact description.

This invention relates to improvements in a machine for testing the strength of paper, well known in the trade as "the Mullen tester".

In a machine or apparatus of the kind to which this invention relates, the paper is held in a clamped condition on a platform which is provided with an elastic diaphragm which forms a wall or closure for a conduit for a liquid contained in a chamber therefor, and which by displacement under a pressure exerted thereon causes a stretching and protrusion of the diaphragm for impingement against the paper to break or rupture the same when the force applied for the displacement of the liquid becomes as great as the bursting strength of the paper.

The object of this invention is to provide in a testing apparatus the diaphragm carrying paper supporting platform of such character that it serves not only as a yielding member of the paper clamp but also as the element for the displacement of the liquid which bulges the diaphragm for the action of the latter on the paper.

The invention is described in conjunction with the accompanying drawing and is defined in the claims.

In the drawing, the figure is substantially a central vertical sectional view through the complete paper testing machine, certain parts thereof being, however, represented in front elevation.

In the drawings, A represents the frame made in the form of a standard and having at the lower portion thereof a chamber to constitute a receptacle for glycerin or other suitable fluid as commonly used in these testers.

B represents the paper supporting platform having a depending hub-like stem $B^2$ which is tubular with the opening therethrough from end to end. This hub like stem $B^2$ is closely fitted and guided for a vertical sliding movement in a cylindrically bored vertical bearing hole $b$ therefor in the frame of the device above the liquid chamber $a$. The platform is constrained against rotative movement by the spline engagement as constituted by the vertical groove $d$ and the stud $e$, the extremity of which engages in the groove.

$f$ represents the elastic diaphragm forming the closure for the upper end of the vertical passage $g$ through the stem of the platform, this being provided as usual and held by the retaining annular member $i$ which constitutes the flat top of the platform.

D represents the paper clamping member which is of annular or spider form and carried at the lower end of a non-rotative screw shaft E and guided through the upper goose-neck portion $A^2$ of the standard. The vertical movements of the shaft and the clamping member carried at the bottom thereof are imparted by rotating the gear wheel F which is internally screw threaded and acts as a nut relatively to the said shaft E. The thrust bearings $k$ are interposed as a desirable equipment in the situation shown. The gear-nut F is rotated by the bevel gear wheel G which is carried on the inner extremity of the horizontal shaft J, on the outer end of which the hand wheel L is provided.

The lower end portion of the tubular stem with the paper supporting platform B is connected centrally with another elastic diaphragm $m$ which forms an entirely inclosing upper wall for the liquid chamber $a$, and by reason of the application of this diaphragm in the position shown, leakage or oozing of the glycerin or other liquid to the exterior of the frame is effectually prevented, and said diaphragm is a factor, also, in the liquid displacement.

M represents the indicator which by the pipe N is connected with the liquid chamber.

The action of the liquid under the pressure transmitted simultaneously through the medium of the elastic diaphragm to the paper to be tested and to the internal parts of the indicator at one and the same time causes the bursting of the paper and the indication on the register N of the force exerted in the breaking of the paper, the same as was the case in the original Mullen tester. In the action of this improved testing device, however, the turning of the hand wheel will cause a lowering of the clamp member D against the paper on the platform, and then the clamp member, paper and platform, under the further turning of the hand wheel will all descend, causing, through the hub like stem, the displacement of the liquid in the chamber $a$, both upwardly through the passage $g$ against the diaphragm to burst the paper, and also through the pipe N for the indication of the displacing pressure which is effective in the making of the test on the paper.

The machine constructed as hereinabove described, is much simplified, and is susceptible more than usual of very convenient and efficient operation.

Although this machine has been, primarily designed, and its most extensive use will be for the testing of paper, it is capable of employment as advantageously also for the testing of other sheet material; and changes in construction and relative arrangement of the parts may be made in the testing machine without departing from this invention or sacrificing any of the advantages thereof.

Claims:—

1. In a testing machine of the character described, in combination, a liquid containing chamber, a platform, for supporting sheet material to be tested, vertically movable relatively to the chamber, a clamping member above and movable relatively to the platform, operative both to clamp the sheet material on the platform and to downwardly move the platform, an elastic diaphragm carried by the platform, and operable, by the displacement of the liquid in said chamber to exert a breaking action upon the sheet material, clamped on the platform, and means actuated by the descent of the platform for displacing said liquid for its action against and for the distention of the diaphragm.

2. In a testing machine, in combination, a frame constructed with a liquid containing chamber therein, and having a guide way through a portion thereof above the chamber, a platform having a hub-like stem with a passage endwise therethrough, which stem is fitted in said guide way with its lower end open to the chamber,—said platform having at its top an elastic diaphragm which closes the upper end of the passage, a clamp member above and movable relatively to the platform, operative both to clamp paper on the platform and to cause a downward movement of the platform whereby through means of its depending stem a displacement of the liquid in the chamber is caused for exerting a breaking action upon the paper, and a pressure indicator connected with the liquid chamber.

3. In a testing machine, in combination, a frame constructed with a liquid containing chamber therein and having a flexible diaphragm above the liquid which is in the chamber, and said frame having a guide way above said diaphragm and provided also with an overhanging head above the portion thereof which is provided with said guide way, a platform having a hub like stem with a passage endwise therethrough, which stem is fitted in said guide way with its lower end in communication with the liquid chamber, and said stem having at a lower portion thereof a connection with said diaphragm,—said platform having at its top an elastic diaphragm which closes the upper end of the passage, a shaft vertically movable in the upper overhanging head, having a clamp member at its bottom, and means for imparting vertical movements to said shaft.

4. In a testing machine, in combination, a liquid containing chamber having a flexible diaphragm above the liquid therein, a platform for supporting sheet material vertically movable relatively to the chamber, having a depending stem provided with a passage endwise therethrough, which stem has connection with said flexible diaphragm and the passage of which is in communication with the chamber below the diaphragm, said platform being also provided at its top with an elastic diaphragm forming a closure for the upper end of said passage, means for clamping paper on the platform, and an indicating pressure gage connected with the liquid containing chamber.

5. In a testing machine, in combination, a liquid containing chamber having a flexible diaphragm above the liquid therein, a platform for supporting sheet material vertically movable relatively to the chamber, having a depending stem provided with a passage endwise therethrough, which stem has connection with said flexible diaphragm, and the passage of which is in communication with the chamber below the diaphragm, said platform being also provided at its top with an elastic diaphragm forming a closure for the upper end of said passage, a member vertically movable relatively to the platform and operative both to clamp paper on the platform and to cause a descent of the platform, and means for imparting vertical movements to said member.

6. In a testing machine, in combination, a frame constructed with a liquid containing chamber therein, having an elastic diaphragm above the liquid in the chamber, said frame having a guide way above said diaphragm, and also provided with an overhanging head above said guide way, a platform having a hub like stem with a passage endwise therethrough, which stem is fitted in said guide way and has the lower end thereof in engagement with said diaphragm,— said platform having at its top an elastic diaphragm which closes the upper end of the said passage, the lower end of which passage is open to the chamber under the first named diaphragm, a shaft axially movable but non rotative relatively to the overhanging head, externally screw threaded and having a clamping member at its bottom, a gear wheel internally threaded and screw engaged with said shaft, an operating shaft having a gear wheel in mesh with the first named one, and a pressure indicating gage connected with the liquid receptacle.

7. In a testing machine, in combination, a liquid containing chamber, a platform for supporting sheet material to be tested, which is vertically movable relatively to the chamber, means for clamping sheet material on the platform, and thereby operative to displace the liquid in said chamber, an elastic diaphragm carried by the platform and adapted to be distended by the displacement of the liquid in said chamber for the exertion of stress upon the sheet material.

8. In a testing machine, in combination, a liquid containing chamber, a platform for supporting sheet material to be tested and means for clamping the sheet material thereon, said platform being vertically movable relatively to the chamber having an opening in communication with the chamber which extends to the top of the platform and which has for covering it an elastic diaphragm whereby under the vertical movement of the platform the displacement of the liquid from the chamber through said passage will cause a distention of the diaphram for the exertion of stress upon the sheet materal.

Signed at Springfield, Mass., in presence of two subscribing witnesses.

JULIA MUNSON,
*Administratrix of the last will and testament of Charles M. Munson, deceased.*

Witnesses:
    WM. S. BELLOWS,
    G. R. DRISCOLL.

---

Copies of this patent may be obtained for five cents each, by addressing the "Commissioner of Patents, Washington, D. C."